(12) United States Patent
Monti

(10) Patent No.: US 8,365,900 B2
(45) Date of Patent: Feb. 5, 2013

(54) SYSTEM FOR REMOVABLY BLOCKING A DRAWING-ABUTTING ELEMENT OF A CASE OR CARTON TO A COGGED BELT, AND A CONVEYOR OBTAINED WITH THE SYSTEM

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 267 days.

(21) Appl. No.: 12/909,924

(22) Filed: Oct. 22, 2010

(65) Prior Publication Data

US 2011/0108390 A1     May 12, 2011

(30) Foreign Application Priority Data

Nov. 6, 2009   (IT) .............................. BO2009A0731

(51) Int. Cl.
*B65G 15/42* (2006.01)
(52) U.S. Cl. ........................................ 198/698; 198/699
(58) Field of Classification Search .................. 198/699, 198/698, 690.2
See application file for complete search history.

(56) References Cited

U.S. PATENT DOCUMENTS

| | | | | |
|---|---|---|---|---|
| 4,865,182 A | * | 9/1989 | Nolte | 198/699 |
| 6,142,290 A | * | 11/2000 | Tagliaferri | 198/716 |
| 6,695,135 B1 | * | 2/2004 | Lapeyre | 198/853 |
| 2010/0236898 A1 | | 9/2010 | Nakamura | |

FOREIGN PATENT DOCUMENTS

| | | |
|---|---|---|
| DE | 102004032735 A | 2/2006 |
| IT | 1340590 A | 4/2004 |
| WO | WO 2009060646 A1 * | 5/2009 |

OTHER PUBLICATIONS

European Search Report, for corresponding EP application No. 2 319 779, dated Jan. 27, 2011, 3 pages.

* cited by examiner

*Primary Examiner* — Mark A Deuble
(74) *Attorney, Agent, or Firm* — William J. Sapone

(57) ABSTRACT

The system for removably blocking a drawing-abutting element to a cogged belt comprises: a drawing-abutting element (2A, 2B, 2C, 2D) of an article (3) in turn comprising a base (13) and an upper portion (14) which develops starting from the base (13) and is conformed for drawing or abutting the article (3); a coupling element (10) fixable to a cogged belt (4) at a first surface (23) of the cogged belt (4) located opposite a side (22) in which cogs (5) are arranged, in order to project with respect to the first surface (23); the base (13) of the drawing-abutting element (2A, 2B, 2C, 2D) affords a seating (11) for receiving the coupling element (10), the seating (11) and the coupling element (10) being conformed such as to joint-couple to one another; the base (13) affords at least a through-hole (17) opening in the first seating (11); the system further comprising first removable fastening means (12) for engaging in the at least a through-hole (17) and blocking the drawing-abutting elements (2A, 2B, 2C, 2D) to the coupling element (10) when the drawing-abutting elements (2A, 2B, 2C, 2D) and the coupling element (10) are joint-coupled to one another.

13 Claims, 6 Drawing Sheets

SYSTEM FOR REMOVABLY BLOCKING A DRAWING-ABUTTING ELEMENT OF A CASE OR CARTON TO A COGGED BELT, AND A CONVEYOR OBTAINED WITH THE SYSTEM

FIELD OF THE INVENTION

The present invention relates to the technical sector of cogged belt conveyor for caseing or cartoning machines.

In particular, the invention relates to a system for removably blocking a drawing-abutting element of articles, in particular cases or cartons, to a cogged belt of a conveyor, and also relates to a conveyor obtained with the system.

DESCRIPTION OF THE PRIOR ART

The Italian patent in the name of Bergami no. 1340590 describes a conveyor used for moving cases, in a conveying direction that is substantially horizontal, comprising: a first pair of cogged belts each ring-wound on a respective drive pulley mounted on a first shaft and an idle pulley mounted on a second shaft; a second pair of cogged belts each ring-wound on a respective drive pulley mounted on the first shaft and an idle pulley mounted on the second shaft.

The belts of the first pair of cogged belts are distanced from one another by a distance that is smaller than the width of the case to be conveyed and each is provided with a series of drawing elements for drawing the case, which elements are appropriately spaced from one another along the development direction of the belt, and a series of support elements for the case, arranged between a drawing element and the next, and opportunely spaced from one another in the development direction of the belt.

Each belt of the second pair of cogged belts is arranged by a flank of one of the belts of the first pair of belts and is provided with series of abutting elements destined to contact the case, specially distanced from one another in the development direction of the belt.

The belts are phased with respect to one another such that the drawing elements of the first pair of belts push the case along the conveying direction while the abutting elements of the second pair of belts stabilize its position during conveying, by abutting the case on the opposite side with respect to the abutting elements.

The drawing elements, the abutting and supporting elements are fixed unremovably to the belt, for example glued or fixed by heat-welding thereto; they can be made of the same material as the belt, for example plastic.

Should it be required to replace one or more drawing or abutting elements of one of the belts, for example due to breakage of an element, the whole belt has to be changed. Apart from leading to costs due to the need to have ready a new belt to mount in the place of the broken one, this also requires the conveyor to be halted for a rather long time, necessary for enable demounting of the belt to be replaced, the mounting of the replacement belt, the verification of the stretching of the new belt and the phasing of the new belt with respect to the other belts of the conveyor.

SUMMARY OF THE INVENTION

The aim of the present invention is to provide a technical solution able to obviate the previously-mentioned drawbacks.

The above aim is obtained by means of a system for removably blocking a drawing-abutting element, in particular cases or cartons, to a cogged belt of a conveyor, and by means of a conveyor.

The system for removably blocking to a cogged belt drawing-abutting element of an article such as a case or carton, comprises: a drawing-abutting element in turn comprising a base and an upper portion developing from the base and conformed such as to draw or abut the article; a coupling element fixable to a cogged belt at a first surface of the cogged belt located opposite a side in which cogs are arranged, such as to project with respect to the first surface; the base of the drawing-abutting element affords, in a lower portion thereof, a first seating for receiving the coupling element, the first seating and the coupling element being conformed to joint-couple to one another; the base affords at least a through-hole opening in the first seating; the drawing-abutting element further comprising first removable fastening means for engaging in the at least a through-hole and blocking the drawing-abutting element to the coupling element when the drawing-abutting element and the coupling element are joint-coupled to one another.

The proposed blocking system enables removably blocking the drawing-abutting element to the cogged belt; the drawing-abutting element is joint-coupled to the coupling element which is fixed to the belt, and subsequently the element is unremovably blocked thereto by removable fastening means.

In order to replace one of the drawing-abutting elements of the conveyor, it is sufficient to disengage the fastening means from the hole of the drawing-abutting element to be replaced, decouple the drawing-abutting element to be replaced from the coupling element, arrange the new drawing-abutting element on the relative coupling element such as to joint-couple it there-with and subsequently insert the fastening means in the hole of the drawing-abutting element in order to block the drawing-abutting element to the coupling element.

This sequence of operations is rapidly performed, and can be done with ease by any operator. Thus the down time of the conveyor for replacing the drawing-abutting element is kept to a minimum and further there is no need to mount a new cogged belt.

The conveyor for transport of articles, i.e. cases or cartons, comprises: at least a cogged belt provided with a first surface which is opposite a side in which relative cogs are located, wherein the drawing-abutting element is removably blocked to the cogged belt; the base of the drawing-abutting element is provided with an upper surface which forms a second seating, which second seating develops along a conveying direction of the articles and is provided with opposite lateral walls; the conveyor further comprises a guide member fixed to a frame of the conveyor, which guide member comprises in turn a first profiled element arranged facing the first surface of the cogged belt at an upper branch of the cogged belt in order to abut lateral walls of the second seating such as to guide the drawing-abutting element longitudinally when the said drawing-abutting element is advancing along the upper branch of the cogged belt.

The above-described conveyor enables effective conveying of cases and further any operator can in a short time replace a drawing-abutting element, for example when an element breaks.

BRIEF DESCRIPTION OF THE DRAWINGS

Specific embodiments of the invention, and advantageous technical-functional characteristics thereof correlated to the embodiments, only in part derivable from the above description, will be described herein below in the present description, in accordance with what is set out in the claims and with the aid of the accompanying figures of the drawings, in which:

DESCRIPTION OF THE PREFERRED EMBODIMENTS

Figure 1:
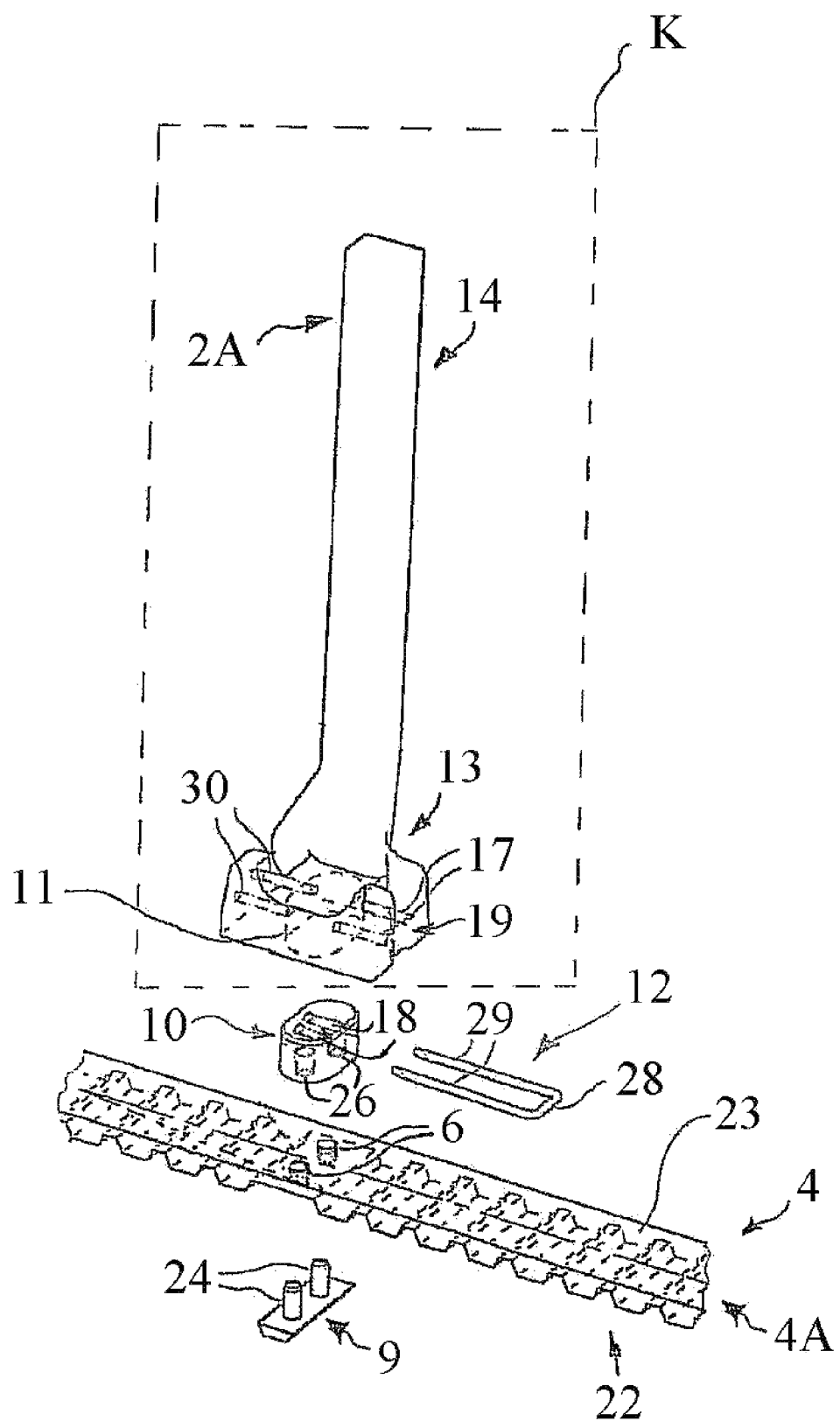
FIG. 1 illustrates a perspective view of the elements of the blocking system which is the object of the present invention.

The system for removably blocking a drawing-abutting element to a cogged belt, object of the present invention, comprises: a drawing-abutting element 2A, 2B, 2C, 2D of an article 3 in turn comprising a base 13 and an upper portion 14 which develops starting from the base 13 and is conformed for drawing or abutting the article 3; a coupling element 10 fixable to a cogged belt 4 at a first surface 23 of the cogged belt 4 located opposite a side 22 in which cogs 5 are arranged, in order to project with respect to the first surface 23; the base 13 of the drawing-abutting element 2A, 2B, 2C, 2D affords, in a lower portion thereof, a first seating 11 for receiving the coupling element 10, the first seating 11 and the coupling element 10 being conformed such as to joint-couple to one another; the base 13 affords at least a first pair of through-holes 17 opening into the first seating 11; and first removable fastening means 12 for engaging in the at least a through-hole 17 and blocking the drawing-abutting element 2A, 2B, 2C, 2D to the coupling element 10 when the drawing-abutting element 2A, 2B, 2C, 2D and the coupling element 10 are joint-coupled to one another: a member 9 arranged at a region of the cogged surface 22 of the belt 4 from which a cog 5 has been removed and conformed such as to unremovably constrain the coupling element 10 to the belt 4.

The coupling element 10, illustrated in FIG. 1 not yet engaged to the member 9, develops longitudinally in a perpendicular direction to the development direction of the belt, in order to maximize the contact surface thereof with the seating 11 of the drawing-abutting element 2A, 2B, 2C, 2D with respect to the coupling element 10 on the plane identified by the first surface 23 of the belt 4 when the elements (10; 2A, 2B, 2C, 2D) are joint-coupled to one another.

The coupling element 10 is made of a metal material, such as to reduce wear and guarantee a stable joint-coupling with the first seating 11 of the drawing-abutting element (2A, 2B, 2C, 2D).

Alternatively the coupling element 10 can also be realized in a non-metal material, for example a plastic material.

The member 9, conformed such as to engage with the coupling element 10, is a preferably metal element and exhibits substantially the same shape as the cogs 5 of the belt 4; alternatively the member 9 can exhibit a different conformation as long as it does not interfere with the seatings of the pulleys on which the belt is wound, in which the cogs of the belt engage.

The member 9 is provided with unremovable fastening means 24 which are a pair of prominences 24 destined to insert in through-holes 6 afforded on the belt 4 and connecting the cogged surface 22 with the opposite surface 23. Each prominence 24 originates from the base of the member 9, developing perpendicularly with respect to the base itself.

The coupling element 10 also affords, on the lower surface, i.e. the surface destined to encounter the surface of the belt 23 from the opposite side to the side bearing the cogs, a pair of holes 26 (FIG. 1) for receiving the pair of prominences 24 of the first element 9, when the prominences 24 have been inserted freely through the holes 6 of the belt 4, such that the coupling element 10 and the member 9 couple to one another by interference. In particular, and significantly, the pair of prominences 24 are shaped as cylindrical elements having a greater diameter than the diameter of the holes 26 of the coupling element 10; it follows that the coupling realized between the pair of prominences 24 and the pair of holes 26 of the coupling element 10 is an unremovable interference coupling. In other words, on completion of assembly, the member 9 and the coupling element 10 are rigidly connected to one another and to the cogged belt 4.

The coupling element 10 comprises a pair of through-holes 18 afforded transversally on the respective lateral surface such that when the coupling element 10 has been joint-blocked with the drawing-abutting element 2A, 2B, 2D, each through-hole 18 is connected to one of the holes 17 of the first pair of through-holes of the drawing-abutting element 2A, 2B, 2C, 2D.

The seating 11 further bears, at the internal wall which is opposite to the one in which the holes 17 of the first pair of holes 17 open, a second pair of holes 30 arranged in such a way that when the coupling element 10 has been joint-blocked with the drawing-abutting element 2A, 2B, 2C, 2D, each hole of the second pair of holes 30 is connected to a hole 18 of the pair of holes of the coupling element 10.

The first removable fastening means comprise a C-shaped element 28 from which two arms 29 develop, which arms 29, when the drawing-abutting element 2A, 2B, 2C, 2D is joint-coupled with the coupling element 10, are destined to insert in the first pair of holes 17 of the drawing-abutting element 2B, 2C, 2D, in the pair of holes 18 of the coupling element 10 and in the second pair of holes 30 of the drawing-abutting element 2A, 2B, 2C, 2D such as to block the drawing-abutting element 2A, 2B, 2C, 2D to the coupling element 10.

The C-shaped member 12 thus prevents the drawing-abutting element 2A, 2B, 2C, 2D from being decoupled from the coupling element 10, for example following application of a force directed along a substantially perpendicular direction to the surface 23 of the belt in which the coupling element 10 is arranged.

The base 13 of the drawing-abutting element 2A, 2B, 2C, 2D bears, at an external surface portion thereof comprised between the holes of the first pair of holes 17, an undercut 19 such that when the C-shaped member 12 is completely inserted in the holes 17, 30 of the drawing-abutting element 2A, 2C, 2D and in the holes 18 of the coupling element 10, an opening is defined between the portion of the external surface comprised between the holes of the first pair 17 of holes of the drawing-abutting element 2A, 2B, 2C, 2D and the base 28 of the C-shaped member 12.

This opening is of such a size as to enable insertion therethrough of a tool for facilitating extraction of the C-shaped member 12 from the holes 17, 30 of the drawing-abutting element 2A, 2B, 2C, 2D and from the holes 18 of the coupling element 10.

A description follows of the blocking process of a drawing element to the belt, in accordance with the blocking system of the present invention.

The coupling element 10 is arranged on the surface 23 of the belt 4 in which there are no cogs 5, while the member 9 is arranged on the side 22 where there are no cogs 5, at the region in which a cog 5 has been removed; the prominences 24 of the member 9 are freely inserted through the holes 6 of the belt 4 in order to engage by interference in the holes 26 of the coupling element 10 such as to removably block the coupling element 10 and the member 9.

The drawing-abutting element 2A, 2B, 2C, 2D is arranged such that the first seating 11 internally receives the relative coupling element 10, so that the drawing-abutting element 2A, 2B, 2C, 2D joint-couples with the coupling element 10; then the arms 29 of the C-shaped member 12 are inserted in the holes (17, 18, 30) of the drawing-abutting element 2A, 2B, 2C, 2D and the coupling element 10 such as to removably block the drawing-abutting element 2A, 2B, 2C, 2D to the coupling element 10.

The replacement of each drawing-abutting element 2A, 2B, 2C, 2D can advantageously be performed without there being any need to have a new belt available, as each drawing-abutting element 2A, 2B, 2C, 2D is removably fixed to the belt and can be replaced, in accordance with what is described herein above, independently of the other drawing-abutting element 2A, 2B, 2C, 2D.

Figure 2:
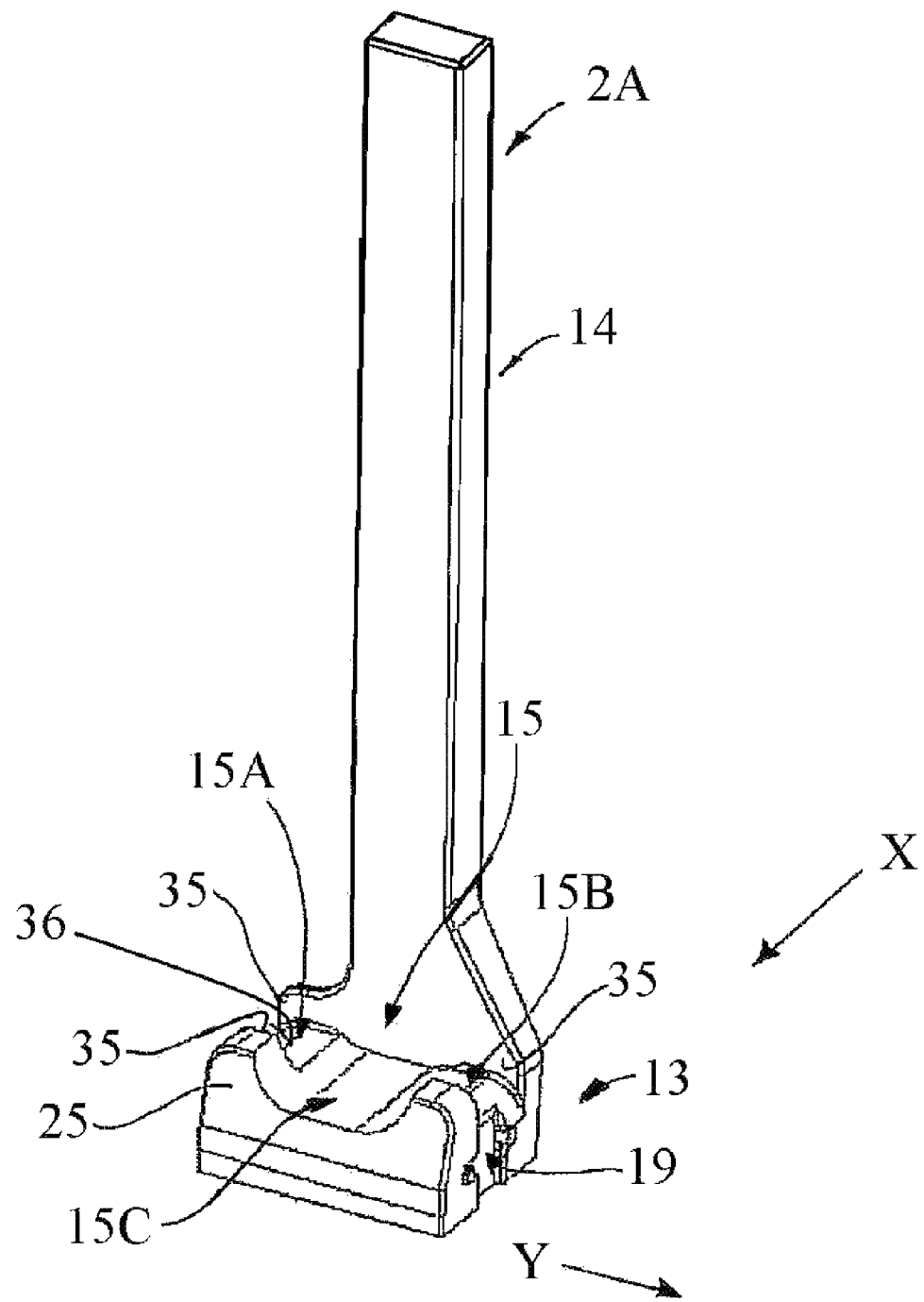
FIG. 2 is a perspective view of detail K of FIG. 1.

In a further embodiment, not illustrated in the figures of the drawings, the first removable fastening means comprise a member 12 having a different shape to what is illustrated in FIGS. 1-2, for example nail-shaped; in accordance with this embodiment the base of the drawing-abutting element 2A, 2B, 2C, 2D affords single hole destined to be engaged by an elongate portion of the member 12 such that when the drawing-abutting element 2A, 2B, 2C, 2D is joint-coupled to the coupling element 10, the insertion of the member 12 in the holes determines blocking of the drawing-abutting element 2A, 2B, 2C, 2D to the coupling element 10.

In yet a further embodiment, not illustrated in the figures of the drawings, the coupling element does not comprise any hole on the lateral surface thereof for being engaged by the first removable fastening means. In this variant, the first removable fastening means are inserted in one or more holes afforded in the base of the drawing-abutting element 2A, 2B, 2C, 2D and opening into the seating, such as to block the drawing-abutting element 2A, 2B, 2C, 2D, when the elements have been joint-coupled to one another, by interference established between the first removable fastening means and the lateral surface of the coupling element.

In a variant of this embodiment, not illustrated in the figures of the drawings, the first removable fastening means comprise a member provided with a threaded portion, for example a grub-screw, and the hole afforded in the base of the drawing-abutting element 2A, 2B, 2C, 2D, being a through-hole opening into the first seating, is threaded; the grub-screw is screwed into the hole when the drawing-abutting element 2A, 2B, 2C, 2D is joint-coupled to the coupling element, up to abutting the lateral surface of the coupling element and determining the blocking of the drawing-abutting element 2A, 2B, 2C, 2D to the coupling element.

In yet a further embodiment of the blocking system, not illustrated in the figures of the drawings, the coupling element is blocked unremovably to the cogged belt, for example by gluing or heat-welding.

Figure 3:
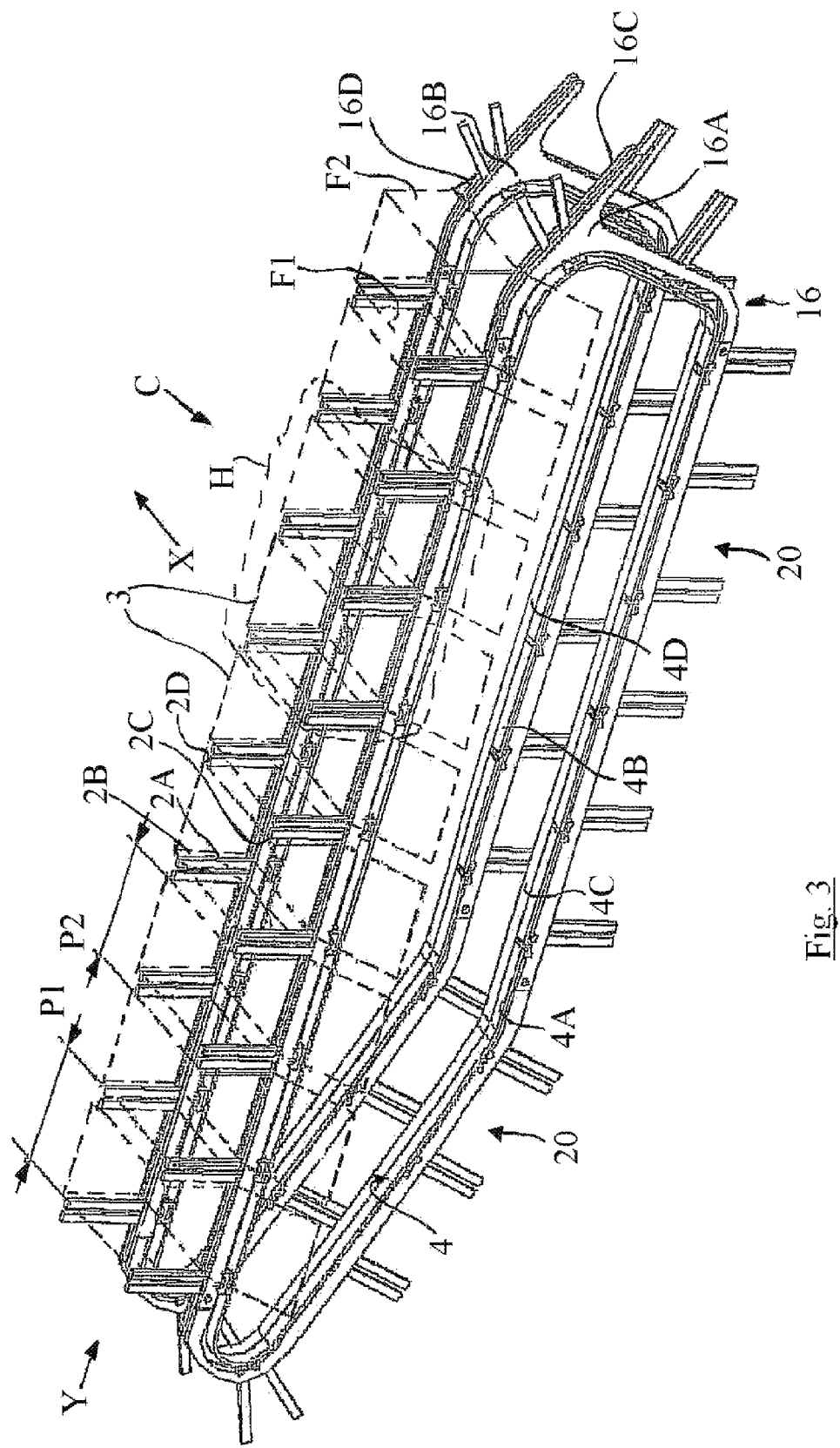
FIG. 3 is a perspective view of a preferred embodiment of the conveyor which is the object of the present invention.
Figure 4:
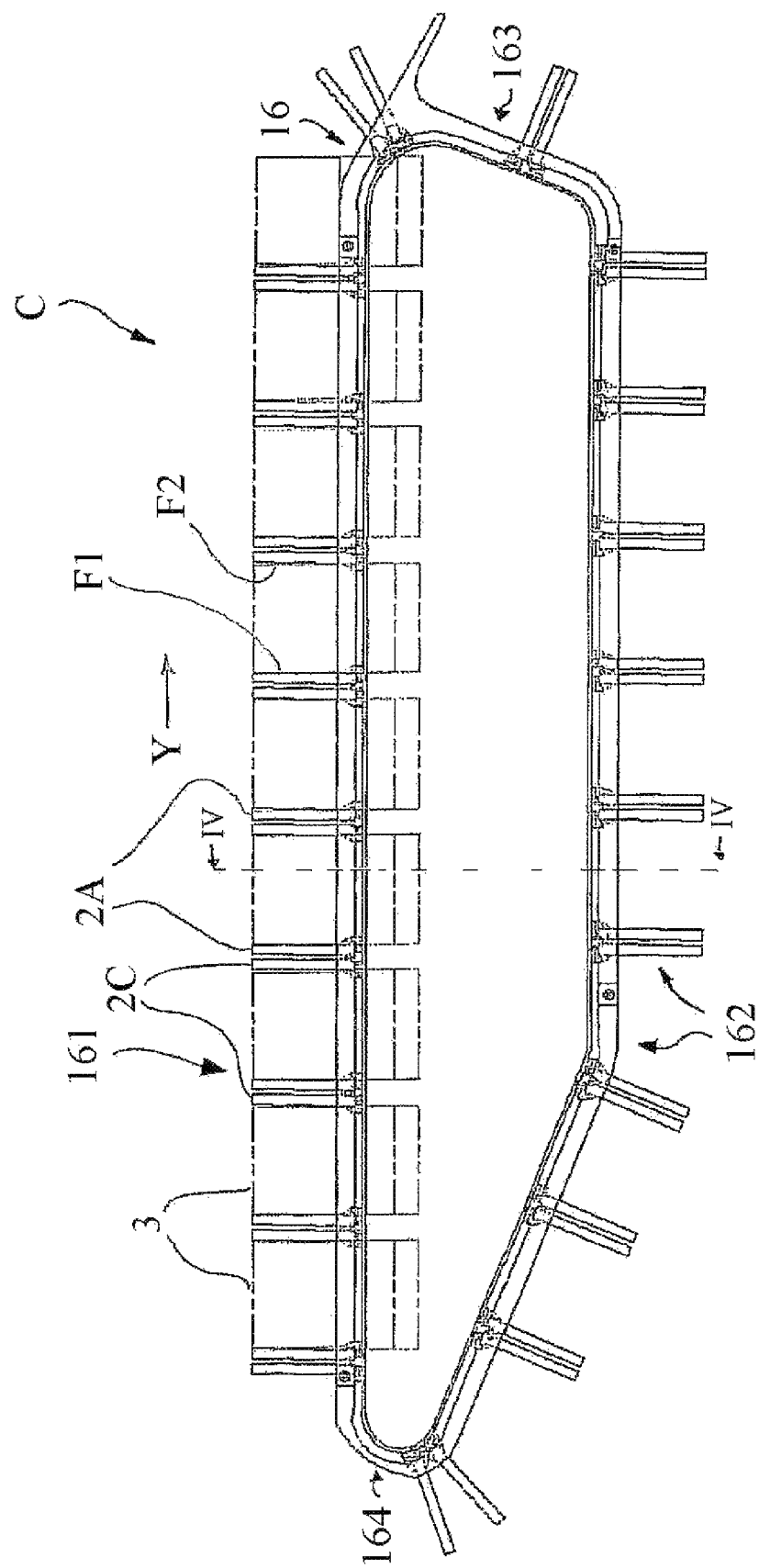
FIG. 4 is a lateral view of the conveyor of FIG. 3.
Figure 5:
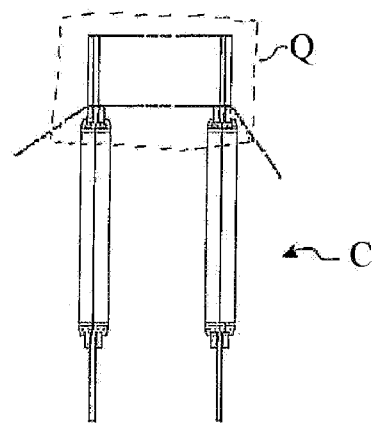
FIG. 5 illustrates a section view along plane IV-IV of the conveyor of FIG. 3.
Figure 7:
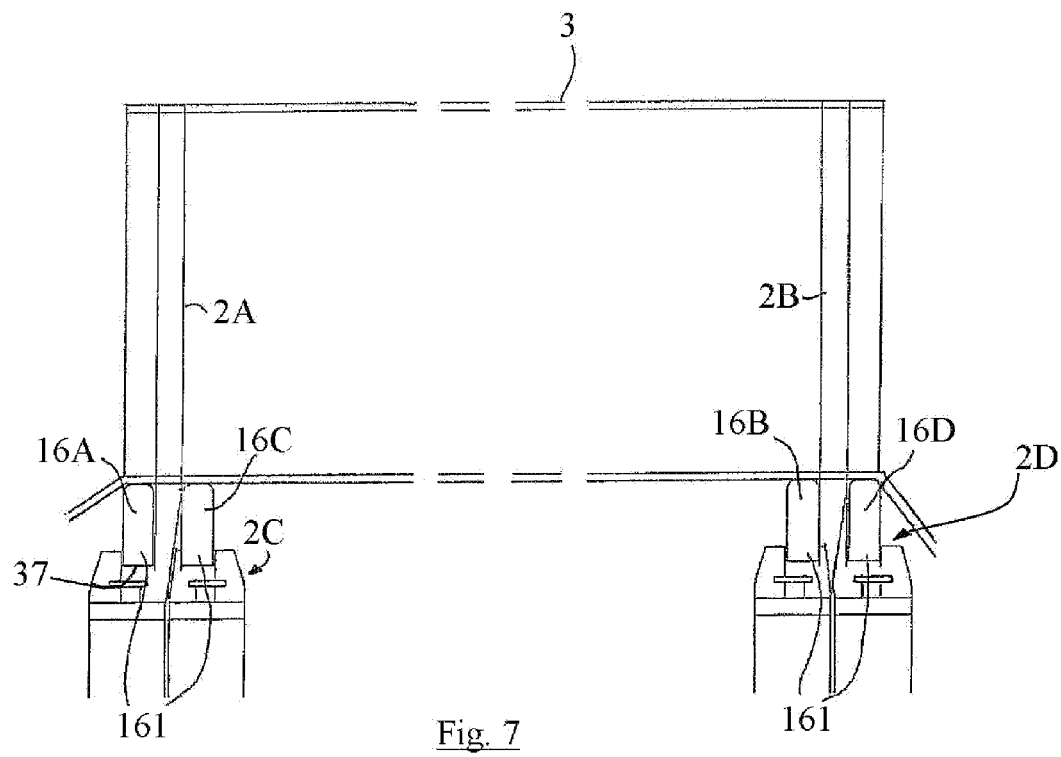
FIG. 7 is an enlarged view of the detail Q of FIG. 5.
Figure 6:
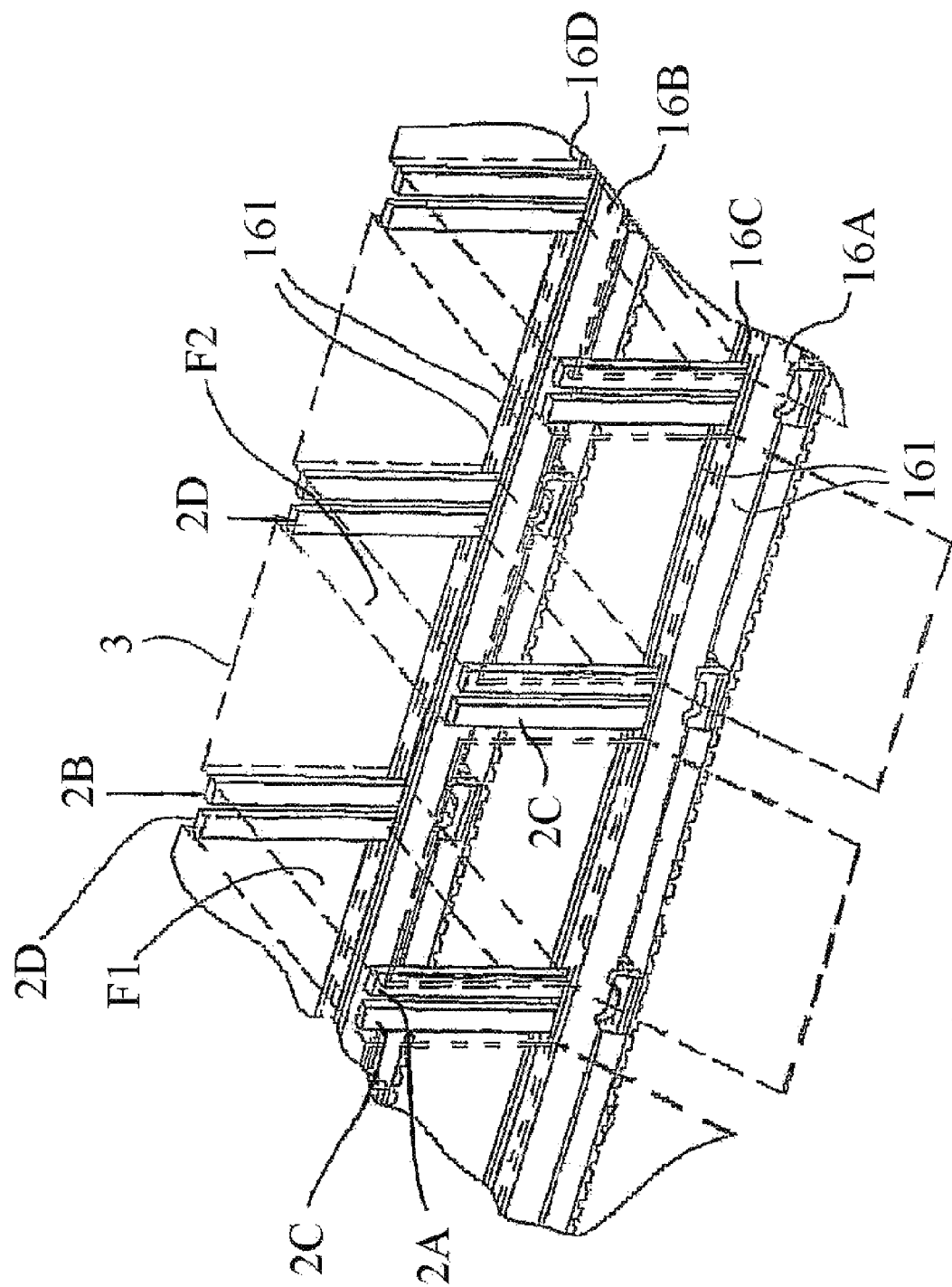
FIG. 6 is a view of detail H of FIG. 3 in an enlarged view.

FIG. 3 illustrates a conveyor C for articles 3, in which four cogged belts 4 are visible, respectively a first cogged belt 4A, a second cogged belt 4D, a third cogged belt 4B, and a fourth cogged belt 4C.

Each cogged belt 4A, 4B, 4C, 4D is ring-wound about corresponding pulleys (not illustrated); the cogged belts are further arranged in flanked pairs, i.e. the first cogged belt 4A is arranged flanked to the fourth cogged belt 4C, identifying a first pair of belts, and the second cogged belt 4D is arranged flanked to the third cogged belt 4B, identifying a second pair of belts.

The first 4A and the third 4B cogged belt each bear a plurality of drawing elements (2A, 2B) removably fixed to the belt by the blocking system described herein above and distanced along the development direction of the belt by a predetermined step P1.

The drawing elements 2A, 2B are each destined to contact each case 3 on opposite sides of a first surface F1 of the case 3 in order to convey it along a conveying direction Y.

The second 4D and fourth 4C belts bear a plurality of abutting elements 2D, 2C, fixed to the belt by means of the blocking system described herein above and distanced along the development direction of the belt by a predetermined step P2.

The abutting elements (2D, 2C) are destined to abut each article 3 on opposite sides of a second surface F2 of the case 3, opposite the first surface F1, such as to stabilize the position of the case 3 during conveying.

The first 4A and the third 4B cogged belt are phased with one another such that the relative drawing elements 2A, 2B are aligned in pairs in direction X of FIG. 3, perpendicular to the conveying direction Y in order for each pair of drawing elements made up by a drawing element 2A of the first belt 4A and a drawing element 2B of the third belt 4B to act on the surface F1 of a case 3 in order to cause its advancement along the conveyor direction Y (FIG. 1).

The second 4D and the fourth belt 4C are phased such that the abutting elements (2D, 2C) of the one 4D and the other 4C are aligned in pairs in direction X of FIG. 1, perpendicular to the conveying direction Y, and are also phased with respect to the first 4A and the third 4B cogged belts such that a pair of abutting elements 2D, 2C made up by an abutting element 2D of the second belt 4D and an abutting element 2C of the fourth belt 4C contacts the case 3 when the case is abutted by a pair of drawing elements 2A, 2B of the first 4A and the third 4B belts.

Each drawing or abutting element (2A, 2B, 2C, 2D) exhibits a second seating 15 afforded at the upper part of the base 13 (FIG. 2,) which second seating 15 develops substantially along direction Y in which the drawing or abutting element is moved.

The second seating 15 centrally exhibits an undercut 15C which subdivides the seating into a first portion 15A and a second portion 15B, substantially U-shaped.

The undercut 15C further interrupts the external lateral wall 25 of the base 13 of the drawing-abutting element in order to laterally discharge the dirt or detritus which accumulate in the second seating 15 during conveying.

The first 15A and the second 15B portions of the seating 15 have a U-section and comprise a facing pair of lateral walls 35 and a lower wall 36 which connects the lateral walls 35; the second seating 15 is destined to receive a portion of a guide member 16, which is fixed to the frame and develops externally of the whole ring-trajectory identified by the belt 4 (FIG. 3).

The conveyor C further comprises four guide members 16, each associated to a belt 4A, 4B, 4C, 4D, respectively a first 16A, a second 16D, a third 16B and a fourth 16C guide member.

Each guide member 16A, 16B, 16C, 16D comprises a plurality of profiled guide elements 161, 162, 163, 164, connected to one another in a closed ring-trajectory and arranged facing the surface 23 of the cogged belt opposite the side 22 in which the cogs 5 are present, in order to abut the lateral walls 35 of the second seating 15 of each drawing-abutting element 2A, 2B, 2C, 2D.

A first profiled guide element 161 extends along the upper branch of the cogged belt such as to abut the lateral walls 35 of the first 15A and the second portion 15B of the second seating 15 of each drawing-abutting element 2A, 2S, 2C, 2D advancing on the upper branch and to guide it longitudinally; further, the first guide element 161 also abuts the lower wall 36 of the first 15A and the second portion 15B of the second seating 15 such as to stabilize the trim of the upper portion 14 of the drawing-abutting element 2A, 2B, 2C, 2D, i.e. such as to prevent oscillations with respect to the vertical of the upper portion 14.

The undercut 15C is advantageously provided in a central position of the second seating 15 such that apart from reducing friction between the second seating and the profiled elements of the guide member 16, the trim of the upper portion 14 of the drawing-abutting element 2A, 2B, 2C, 2D is more greatly stabilized as the profiled elements of the guide member 16 abut a pair of lower walls 36 arranged, with reference to the conveying direction Y, on opposite sides of the base 13.

The first profiled guide element 161 of each guide member 16A, 16B, 16C, 16D further supports the cases 3 on the upper branch of the closed-ring trajectory identified by the respective belt 4A, 4B, 4C, 4D, i.e. the bottom of each case 3 advancing along the conveyor C is resting on the first profiled elements of the guide members 16A, 16B, 16C, 16D of the conveyor C.

Further, each guide member 16A, 16B, 16C, 16D comprises a second profiled element 162, arranged along the lower branch 20 of the belt in order to abut the lower wall 36 of the first 15A and the second 15B portion of the second seating 15 of each drawing-abutting element 2A, 2B, 2C, 2D advancing along the lower branch 20 and supporting the drawing-abutting element 2A, 2B, 2C, 2D along the lower branch 20.

This enables advantageously preventing undesired oscillation of the drawing-abutting element 2A, 2B, 2C, 2D in the lower branch 20 of the belt, due to the weight of the drawing-abutting element 2A, 2B, 2C, 2D and consequently enables preventing the drawing-abutting element 2A, 2B, 2C, 2D in the lower branch 20 from following a different trajectory from the predetermined one.

The profiled guide elements 161, 162, 163, 164 of the guide members 16 are surface-coated with a low-friction coefficient material. such as to minimize the friction with the lateral walls 35 and with the lower wall 36 of the second seating 15 of the drawing-abutting elements 2A, 2B, 2C, 2D of the conveyor C.

In a variant of the conveyor, not illustrated in the drawings, the conveyor comprises: a belt; a plurality of coupling elements removably fixed to the belt by means of the blocking system described herein above; a guide member comprising a profiled element fixed to the frame and arranged at the upper branch of the belt, facing opposite the surface of the belt opposite the side in which the cogs are not present, for abutting the lateral walls of the second seating of each drawing element such as to guide it longitudinally during the advancement on the upper branch.

The above has been described purely by way of non-limiting example, and any constructional variants applied thereto are understood to fall within the ambit of protection of the present technical solution, as described herein above and as claimed herein below.

The invention claimed is:

1. A system for removably blocking at least a drawing-abutting element (2A, 2B, 2C, 2D) of an article (3), being a case or a carton, to a cogged belt, comprising: a drawing-abutting element (2A, 2B, 2C, 2D) of an article (3) in turn comprising a base (13) and an upper portion (14) which develops starting from the base (13) and is conformed for drawing or abutting the article (3), wherein: it comprises a coupling element (10) fixable to a cogged belt (4) at a first surface (23) of the cogged belt (4) located opposite a side (22) in which cogs (5) are arranged, in order to project with respect to the first surface (23); the base (13) of the drawing-abutting element (2A, 2B, 2C, 2D) affords, in a lower portion thereof, a first seating (11) for receiving the coupling element (10), the first seating (11) and the coupling element (10) being conformed such as to joint-couple to one another; the base (13) affords at least a through-hole (17) opening in the first seating (11); the drawing-abutting element (2A, 2B, 2C, 2D) further comprising first removable fastening means (12) for engaging in the at least a through-hole (17) and blocking the drawing-abutting element (2A, 2B, 2C, 2D) to the coupling element (10) when the drawing-abutting element (2A, 2B, 2C, 2D) and the coupling element (10) are joint-coupled to one another, wherein the first removable fastening means (12) comprise a C-shaped member (12) comprising a base (28) and two arms (29) which develop from the base (28); the base (13) of the drawing-abutting element (2A, 2B, 2C, 2D) exhibits a pair of through-holes (17) opening in the first seating (11); the coupling element (10) affords a second pair of holes (18);

the holes of the first pair of through-holes (17) and the second pair of holes (18) are located such as to be in mutual communication when the drawing-abutting element (2A, 2B, 2C, 2D) is joint-coupled to the coupling element (10) and wherein the holes of the first pair (17) and the second pair (18) are further of an apt size for receiving the arms (29) of the C-shaped member (12), and, wherein the holes (18) of the second pair of holes of the coupling element (10) are through-holes; the first seating (11) affords a third pair of holes (30) located at an internal wall thereof facing an internal wall affording the holes of the first pair of holes (17); the holes of the first pair of holes (17), the second pair of through-holes (18) and the third pair of holes (30) are located such as to be in communication with one another when the drawing-abutting element (2A, 2B, 2C, 2D) is joint-coupled with the coupling element (10); the holes of the first pair (17), the second pair (18) and the third pair (30) of holes being of an apt size for receiving the arms (29) of the C-shaped member (12).

2. The system of claim 1, wherein the coupling element (10) develops longitudinally in order to maximize a contact surface between the coupling element (10) and the first seating (11) of the drawing-abutting element (2A, 2B, 2C, 2D), when the drawing-abutting element (2A, 2B, 2C, 2D) is joint-coupled with the coupling element (10).

3. The system of claim 1, wherein the base (13) of the drawing-abutting element (2A, 2B, 2C, 2D) affords, at an external surface portion thereof comprised between the holes of the first pair of holes (17), an undercut (19) such that when the C-shaped member (12) is completely inserted in the holes (17, 30) of the drawing-abutting element (2A, 2B, 2C, 2D) and in the holes (18) of the coupling element (10), an opening is defined between the portion of the external surface comprised between the holes of the first pair (17) of holes of the drawing-abutting element (2A, 2B, 2C, 2D) and the base (28) of the C-shaped member (12), the opening being of such a size as to enable insertion there-through of a tool for facilitating extraction of the C-shaped member (12) from the holes (17, 30) of the drawing-abutting element (2A, 2B, 2C, 2D) and from the holes (18) of the coupling element (10).

4. A system for removably blocking at least a drawing-abutting element (2A, 2B, 2C, 2D) of an article (3), being a case or a carton, to a cogged belt, comprising: a drawing-abutting element (2A, 2B, 2C, 2D) of an article (3) in turn comprising a base (13) and an upper portion (14) which develops starting from the base (13) and is conformed for drawing or abutting the article (3), wherein: it comprises a coupling element (10) fixable to a cogged belt (4) at a first surface (23) of the cogged belt (4) located opposite a side (22) in which cogs (5) are arranged, in order to project with respect to the first surface (23); the base (13) of the drawing-abutting element (2A, 2B, 2C, 2D) affords, in a lower portion thereof, a first seating (11) for receiving the coupling element (10), the first seating (11) and the coupling element (10) being conformed such as to joint-couple to one another; the base (13) affords at least a through-hole (17) opening in the first seating (11); the drawing-abutting element (2A, 2B, 2C, 2D) further comprising first removable fastening means (12) for engaging in the at least a through-hole (17) and blocking the drawing-abutting element (2A, 2B, 2C, 2D) to the coupling element (10) when the drawing-abutting element (2A, 2B, 2C, 2D) and the coupling element (10) are joint-coupled to one another, wherein the coupling element (10) is welded to the belt (4).

5. A system for removably blocking at least a drawing-abutting element (2A, 2B, 2C, 2D) of an article (3), being a case or a carton, to a cogged belt, comprising: a drawing-abutting element (2A, 2B, 2C, 2D) of an article (3) in turn comprising a base (13) and an upper portion (14) which develops starting from the base (13) and is conformed for drawing or abutting the article (3), wherein: it comprises a coupling element (10) fixable to a cogged belt (4) at a first surface (23) of the cogged belt (4) located opposite a side (22) in which cogs (5) are arranged, in order to project with respect to the first surface (23); the base (13) of the drawing-abutting element (2A, 2B, 2C, 2D) affords, in a lower portion thereof, a first seating (11) for receiving the coupling element (10), the first seating (11) and the coupling element (10) being conformed such as to joint-couple to one another; the base (13) affords at least a through-hole (17) opening in the first seating (11); the drawing-abutting element (2A, 2B, 2C, 2D) further comprising first removable fastening means (12) for engaging in the at least a through-hole (17) and blocking the drawing-abutting element (2A, 2B, 2C, 2D) to the coupling element (10) when the drawing-abutting element (2A, 2B, 2C, 2D) and the coupling element (10) are joint-coupled to one another, and further comprising a conveyor (C) for transporting articles (3), being cases or cartons, comprising at least a cogged belt (4A, 4B, 4C, 4D) provided with a first surface (23) which is opposite a side (22) in which relative cogs (5) are located, wherein the drawing-abutting element (2A, 2B, 2C, 2D) is removably blocked to the cogged belt (4A, 4B, 4C, 4D); the base (13) of the drawing-abutting element (2A, 2B, 2C, 2D) is provided with an upper surface which forms a second seating (15), which second seating (15) develops along a conveying direction of the articles (Y) and is provided with opposite lateral walls (35); and further comprises a guide member (16) fixed to a frame of the conveyor (C), which guide member (16) comprises in turn a first profiled element (161) arranged facing the first surface (23) of the cogged belt (4A, 4B, 4C, 4D) at an upper branch of the cogged belt (4A, 4B, 4C, 4D) in order to abut lateral walls (35) of the second seating (15) such as longitudinally to guide the drawing-abutting element (2A, 2B, 2C, 2D) when the said drawing-abutting element (2A, 2B, 2C, 2D) is advancing along the upper branch of the cogged belt (4A, 4B, 4C, 4D).

6. The system of claim 5, wherein the first profiled element (161) is conformed such as to support the articles (3) advancing along the upper branch of the cogged belt (4A, 4B, 4C, 4D).

7. The system of claim 5, wherein the guide member (16) further comprises a second profiled element (162) facing the first surface (23) of the cogged belt (4A, 4B, 4C, 4D) at a lower branch (20) thereof in order superiorly to abut the second seating (15) such as to support the drawing-abutting element (2A, 2B, 2C, 2D) when the said drawing-abutting element (2A, 2B, 2C, 2D) is advancing along the lower branch (20) of the cogged belt (4A, 4B, 4C, 4D).

8. The system of claim 7, wherein the guide member (16) further comprises a third and a fourth profiled guide element (163, 164) arranged facing the first surface (23) of the cogged belt (4A, 4B, 4C, 4D) in order to connect the first profiled guide element (161) and the second profiled guide element (162) in a closed ring trajectory, the first profiled guide element (161), the second profiled guide element (162), the third profiled guide element (163) and the fourth profiled guide element (164) being arranged such as to abut the lateral walls (35) of the second seating (15) such as longitudinally to guide the drawing-abutting element (2A, 2B, 2C, 2D) when the said drawing-abutting element (2A, 2B, 2C, 2D) is advancing along the closed-ring trajectory identified by the cogged belt (4A, 4B, 4C, 4D).

9. The system of claim 5, wherein the second seating (15) affords, in a substantially central position, an undercut (15C) for minimizing the surface of the second seating (15) which abuts the guide member (16), with a consequent reduction of friction between the second seating (15) and the guide member (16) when the drawing-abutting element (2A, 2B, 2C, 2D) is advancing along the closed-ring trajectory identified by the cogged belt (4A, 4B, 4C, 4D).

10. The system of claim 9, wherein the guide member (16) comprises a flat surface (37) facing the first surface (23) of the cogged belt (4A, 4B, 4C, 4D) and wherein the second seating (15) comprises two flat abutting walls (36) arranged respectively at opposite ends of the undercut (15C) and which each connect the two opposite lateral walls (35) of the second seating (15).

11. The system of claim 10, wherein the undercut (15C) develops perpendicular to the development direction (Y) of the second seating (15) up to an external lateral wall (25) of the base (13) such as to facilitate expulsion towards outside of waste material which deposits on the second seating (15) when the drawing-abutting element (2A, 2B, 2C, 2D) is advancing along the closed-ring trajectory identified by the cogged belt (4A, 4B, 4C, 4D).

12. The system of claim 6, wherein: at the portion of the cogged belt (4A, 4B, 4C, 4D) in which the drawing-abutting element (2A, 2B, 2C, 2D) is blocked, a cog of the cogged belt (4A, 4B, 4C, 4D) has been removed; the portion of the cogged belt (4A, 4B, 4C, 4D) is provided with at least a through-hole (6) which sets the first surface (23) in communication with the opposite cogged surface (22) of the cogged belt (4A, 4B, 4C, 4D); the coupling element (10) is provided with at least a hole (26) on a bottom side thereof; a member (9) is provided having a same shape as a cog of the cogged belt (4A, 4B, 4C, 4D); second unremovable fastening means (24) are provided, which engage with the at least a through-hole (6) afforded in the portion of the cogged belt (4A, 4B, 4C, 4D), with the hole (26) afforded on the lower side of the coupling element (10) and with the member (9), thus realizing an unremovable fastening of the member (9) and the coupling element (10) to the cogged belt (4A, 4B, 4C, 4D) respectively on the side of the relative cogged surface (22) and the first surface (23).

13. The system of claim 6, wherein: the portion of the cogged belt (4A, 4B, 4C, 4D) where a cog of the cogged belt (4A, 4B, 4C, 4D) has been removed is provided with two through-holes (6) which place the first surface (23) in communication with the opposite cogged surface (22) of the cogged belt (4A, 4B, 4C, 4D); the coupling element (10) is provided with two holes (26) on the bottom side thereof; the second unremovable fastening means (24) are two prominences which originate perpendicularly from the base of the member (9) to engage with the through-holes (6) of the cogged belt (4A, 4B, 4C, 4D) and with the holes (26) afforded on the lower side of the coupling element (10), the prominences (24) and the holes (26) afforded in the lower side of the coupling element (10) being of such a size as to enable a coupling by unremovable interference between the member (9) and the coupling element (10).

* * * * *